| United States Patent [19] | [11] Patent Number: 4,920,088 |
| --- | --- |
| Kolts | [45] Date of Patent: Apr. 24, 1990 |

[54] CATALYST FOR THE OXIDATION OF CARBON MONOXIDE

[75] Inventor: John W. Kolts, Ochelata, Okla.

[73] Assignee: Phillips Petroleum Company, Bartlesville, Okla.

[21] Appl. No.: 192,264

[22] Filed: May 6, 1988

Related U.S. Application Data

[63] Continuation-in-part of Ser. No. 94,467, Sep. 21, 1987, abandoned.

[51] Int. Cl.$^5$ .................. B01J 21/06; B01J 23/42; B01J 23/44; B01J 23/89
[52] U.S. Cl. .................................................... 502/326
[58] Field of Search ............... 502/326, 330, 331, 339, 502/302

[56] References Cited

U.S. PATENT DOCUMENTS

| | | | |
| --- | --- | --- | --- |
| 3,023,173 | 2/1962 | Nixon | 252/466 |
| 3,794,588 | 2/1974 | Stiles | 252/462 |
| 3,873,469 | 3/1975 | Foster et al. | 252/455 R |
| 3,909,452 | 9/1975 | Acres | 252/455 R |
| 3,963,827 | 6/1976 | Acres et al. | 423/239 |
| 4,117,082 | 9/1978 | Matsuyama | 423/247 |
| 4,123,391 | 10/1978 | Noguchi et al. | 252/466 PT |
| 4,252,687 | 2/1981 | Dale et al. | 252/455 Z |
| 4,297,245 | 10/1981 | Bartley et al. | 252/460 |
| 4,350,613 | 9/1982 | Noshino et al. | 252/455 R |
| 4,374,047 | 2/1983 | Bozon et al. | 503/339 |
| 4,388,277 | 6/1983 | Wright | 422/211 |
| 4,490,482 | 12/1984 | Mathieu | 502/339 |
| 4,492,770 | 1/1985 | Blanchard et al. | 502/304 |
| 4,499,205 | 2/1985 | Masuda | 502/303 |
| 4,524,051 | 6/1985 | Wright et al. | 423/247 |
| 4,537,873 | 8/1985 | Kato et al. | 502/242 |
| 4,621,071 | 11/1986 | Blanchard et al. | 502/302 |
| 4,639,432 | 1/1987 | Holt et al. | 502/324 |
| 4,719,197 | 1/1988 | Vogt et al. | 502/339 |

FOREIGN PATENT DOCUMENTS

| | | | |
| --- | --- | --- | --- |
| 59-112835 | 6/1984 | Japan | 502/339 |
| 1116585 | 6/1968 | United Kingdom . | |
| 2028571 | 3/1980 | United Kingdom . | |
| 2083687 | 3/1982 | United Kingdom . | |

OTHER PUBLICATIONS

"Celcor ® Honeycomb Ceramic Catalyst Supports", Corning Glass Works.
"The Catalytic Oxidation of CO for Sealed $CO_2$ Laser Applications", by I. M. Miller et al., Fall 1985, ACS Meeting, Chicago, Division of Colloid and Surface Chemistry, Paper No. 115.

*Primary Examiner*—W. J. Shine
*Attorney, Agent, or Firm*—K. K. Brandes

[57] ABSTRACT

A composition of matter comprising titania and Pt and/or Pd is prepared by a process comprising one step of heating Pt and/or Pd/impregnated titania with a reducing gas, in particular free hydrogen, at a temperature of about 300°–800° C. Another composition of matter comprising titania and Pt and/or Pd is prepared by a process comprising the steps of coating a porous ceramic material (preferably a monolith) with colloidal $TiO_2$, drying, impregantion with Pt and/or Pd, drying/calcining, and reducing with a reducing gas, in particular free hydrogen, at a temperature of about 0°–300° C. Both compositions of matter are used as a catalyst in a process for oxidizing CO to $CO_2$, e.g., in a $CO_2$ laser.

87 Claims, 3 Drawing Sheets

CATALYST FOR THE OXIDATION OF CARBON MONOXIDE

This is a continuation-in-part application of copending application Ser. No. 094,467, filed Sept. 21, 1987, now abandoned.

BACKGROUND OF THE INVENTION

This invention relates to the oxidation of carbon monoxide to carbon dioxide. In another aspect, this invention relates to the catalytic oxidation of carbon monoxide, in particular under conditions suitable for laser applications. In a further aspect, this invention relates to effective CO oxidation catalyst compositions. In still another aspect, this invention relates to a process for preparing CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Several patents, such as U.S. Pat. Nos. 4,490,482 and 4,639,432, disclose compositions useful as CO oxidation catalysts in $CO_2$ laser applications. However, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is another object to provide a process for preparing a composition of matter which is effective as a catalyst for the oxidation of carbon monoxide. It is a further object of this invention to provide an effective process for catalytically oxidizing carbon monoxide. Other objects and advantages will be apparent from the detailed description and the claims.

In accordance with this invention, a process for preparing a composition of matter comprising Pt and/or Pd metal and $TiO_2$ (suitable and effective as a catalyst composition for the oxidation of carbon monoxide by reaction with free oxygen) comprises the steps of:

(a) contacting (preferably impregnating)
a support material (from which silica is substantially absent) comprising (preferably consisting essentially of) titanium dioxide (titania)
with a solution comprising at least one dissolved compound of at least one noble metal selected from the group consisting of platinum and palladium (preferably Pt);

(b) heating the material obtained in step (a) under such conditions as to substantially dry said material obtained in step (a) and to at least partially (preferably substantially) convert said at least one compound of Pt and/or Pd to at least one oxides of Pt, oxides of Pd, Pt metal and Pd metal; and (c) heating the material obtained in step (b) in a reducing gas atmosphere, preferably a free hydrogen containing gas, more preferably a stream of $H_2$, at a temperature in the range of from about 300° to about 800° C., under such conditions as to activate said material obtained in step (b), i.e, to make the material obtained in step (b) more active as a catalyst for CO oxidation by reaction with $O_2$, and to form (obtain) the composition of matter defined above.

In a preferred embodiment, heating step (b) is carried out in two sub-steps:

(b1) heating the material obtained in step (a) at a first temperature so as to remove substantially all liquids [i.e., the solvent of the solution used in step (a)] from said material obtained in step (a), and (b2) heating (calcining) the substantially dried material obtained in step (b1) at a second temperature, which is higher than said first temperature, so as to at least partially (preferably substantially) convert said at least one compound of Pt and/or Pd to at least one of oxides of Pt, oxides of Pd, metallic Pt and metallic Pd (i.e., Pt oxide and/or Pd oxide and/or Pt metal and/or Pd metal).

In another preferred embodiment, the solution used in step (a) additionally comprises at least one dissolved compound of at least one metal selected from the group consisting of rhenium, iron, ruthenium, copper and silver, which are at least partially (preferably substantially) converted to metal oxides in step (b) or, alternatively, step (b2). In another preferred embodiment, compounds of chromium, manganese and zinc are substantially absent (besides silica) from the material obtained in step (c). In a further preferred embodiment, the titania support material, before its being used in step (a) has been extracted with an aqueous acidic solution (so as to remove undesirable impurities therefrom), treated with an alkaline solution, washed (e.g., with water), dried, and then calcined (e.g., at about 200°–800° C., preferably for about 0.5–10 hours).

In a particular preferred embodiment, a process for preparing a composition of matter comprising Pt and/or Pd metal and $TiO_2$ (effective as a CO oxidation catalyst composition) comprises the step of:

(A) impregnating a porous ceramic material (preferably monolith material, i.e., a porous ceramic honeycomb material) with a colloidal dispersion (also referred to as a colloidal solution) of titania in a suitable liquid dispersion medium (preferably water), wherein dispersed silica is substantially absent in said colloidal dispersion;

(B) heating the titania-coated material obtained in step (A) so as to obtain a substantially dried titania-coated porous ceramic material;

(C) contacting (preferably impregnating) the titania-coated ceramic material (preferably monolith material) obtained in step (B) with a solution (preferably aqueous), comprising at least one dissolved compound of at least one noble metal selected from the group consisting of platinum and palladium (preferably Pt);

(D) heating the material obtained in step (C) under such conditions as to substantially dry the material obtained in step (C) and to at least partially (preferably substantially) convert said at least one compound of Pd and/or Pt to at least one of oxides of Pt, oxides of Pd, Pt metal and Pd metal; and (E) heating the material obtained in step (D) in a reducing gas atmosphere, preferably a free hydrogen containing gas, more preferably a stream of $H_2$, at a temperature in the range of from about 0° C. to about 300° C., under such conditions as to activate said material obtained in step (D), i.e., to make it more active as a CO oxidation catalyst, and to form (obtain) the composition defined above.

The impregnation step (A) can be carried out once or twice or more than twice in sequence, so as to ensure adequate coating of the monolith with $TiO_2$. Step (D) can be carried out as a sequence of sub-steps: drying sub-step (D1) and calcining sub-step (D2). The conditions of drying steps (B) and (D1) are substantially the same as those of drying sub-step (b1), described above. The conditions of calcining sub-step (D2) is substantially the same as those of calcining sub-step (b2), described above.

Also in accordance with this invention, there is provided a composition of matter (useful and effective as a catalyst composition for the oxidation of CO with $O_2$), from which silica is substantially absent, comprising (i) a support material comprising (preferably consisting essentially of) titania and (ii) at least one noble metal selected from the group consisting of Pt and Pd; said composition of matter having been prepared by the process, described above, comprising steps (a), (b) and (c); or, alternatively, steps (a), (b1), (b2) and (c); or, preferably, steps (A), (B), (C), (D) and (E), as defined above. Preferably said composition of matter comprises Pt and additionally (iii) at least one substance selected from the group consisting of rhenium oxide, iron oxide, ruthenium metal, ruthenium oxide, copper metal, copper oxide, silver metal, silver oxide, samarium oxide and europium oxide, preferably iron oxide. In one preferred embodiment, the composition of matter of this invention consists essentially of components (i) and (ii). In another preferred embodiment, the composition of matter consists essentially of component (i), Pt metal and component (iii).

Further in accordance with this invention, a process for oxidizing carbon monoxide comprises contacting a gas comprising CO and $O_2$ with a catalyst composition (from which silica is substantially absent) comprising titania and at least one noble metal selected from the group consisting of Pt and Pd; said catalyst composition having been prepared by a process comprising steps (a), (b) and (c); or, alternatively, (a), (b1), (b2) and (c); or, preferably, (A), (B), (C), (D) and (E), as defined above, under such conditions as to at least partially (preferably substantially) convert CO and $O_2$ to $CO_2$.

Preferably, in the CO oxidation in process of this invention the catalyst composition of this invention (described above) additionally comprises component (iii), as defined above, preferably iron oxide (e.g., FeO and/or $Fe_2O_3$ and/or $Fe_3O_4$). Also preferably, compounds of Cr, Mn and Zn are substantially absent from the catalyst composition (besides $SiO_2$). In a preferred embodiment, the CO oxidation process of this invention is carried out at a temperature of below 400° C. (more preferably from about $-30°$ C. to about 170° C.). In another preferred embodiment, the CO oxidation process is carried out in a $CO_2$ laser so as to recombine CO and $O_2$, which have been formed by decomposition of $CO_2$.

DETAILED DESCRIPTION OF THE INVENTION

Any titania-containing support material can be used as the support material (i). Titania, as the preferred support material, is commercially available. The method of preparation of titania is not considered critical. Titania can be prepared by flame hydrolysis of volatile titania compounds; or by precipitation from an aqueous solutoin of titanium compounds with an alkaline reagent, followed by washing, drying and calcining; and the like. If mixtures of titania with alumina and/or magnesia are used, any suitable weight ratio can be used (such as from 1-99 weight-% $TiO_2$ and from 99-1 weight-% $Al_2O_3$ and/or MgO).

Generally the surface area (determined by the $BET/N_2$ method; ASTM D3037) of titania is in the range of from about 10 to about 300 $m^2/g$. Titania can have spherical, trilobal, quadrilobal or irregular shapes. When titania sphers are used, their diameter generally is in the range of from about 0.5 to about 5 mm. Silica should be substantially absent from the support material (i.e., silica should not be present at a level higher than about 0.5, preferably about 0.2, weight-% each).

It is within the scope of this invention to prepare suitable support materials by coating a porous ceramic material, such as a monolith (commercially available from Corning Glass Works, Corning, NY), described in U.S. Pat. Nos. 4,388,277 and 4,524,051, with titania. Other suitable porous ceramic support materials are glass frits, sinterd alumina and the like (such as those disclosed in U.S. Pat. No. 3,963,827). The choice of the ceramic material is determined by cost, pore structure, surface area, attrition resistance and similar factors. The porous ceramic material (preferably a monolith) can be impregnated with organic compounds of Ti (such as a titanium tetraalkoxide), hydrolyzed, dried and calcined. Or the porous ceramic material (preferably monolith) can be impregnated with a dispersion of titania particles, followed by drying and calcining.

In the presently more preferred embodiment of this invention, a monolith is impregnated with a colloidal dispersion (colloidal solution) of titania in step (A). Preferably, colloidal particles of titania having an average particle diameter of about 1 to about 100 nanometers, more preferably about 5 to about 20 nanometers, are dispersed in any suitable liquid dispersion medium, such as water, alcohols, ketones and the like, preferably water. Generally, the concentration of $TiO_2$ in the colloidal dispersion is in the range of from about 0.1 to about 50, preferably from about 5 to about 25, weight percent $TiO_2$. The weight ratio of colloidal dispersion of $TiO_2$ to monolith material in step (A) is chosen so as to provide a $TiO_2$ content of the material obtained in step (B) in the range of from about 1 to about 40 weight-% $TiO_2$, preferably about 5 to about 30 weight-% $TiO_2$.

The impregnation of the titania-containing support material with Pt and/or Pd (preferably Pt) in steps (a) and (c), respectively, can be carried out in any suitable manner. First, compounds of Pt and/or Pd are dissolved in a suitable solvent (preferably water) so as to prepare solutions of suitable concentration, generally containing from about 0.005 to about 0.20, preferably about 0.01 to about 0.1, g Pt and/or Pd per cc of solution. Non-limiting examples of suitable compounds of Pt and Pd are: $PtCl_2$, $PtCl_4$, $H_2PtCl_6$, $PtBr_4$, $Pt(NH_3)_4Cl_2$, $Pt(NH_3)_4(NO_3)_2$ and the like; $PdCl_2$, $PdCl_4$, $H_2PdCl_6$, $Pd(NH_3)_4(NO_3)_2$ and the like; preferably (at present) $Pt(NH_3)_4(NO_3)_2$ and $Pd(NH_3)_4(NO_3)_2$. The $TiO_2$-containing support material is then impregnated by soaking it in the solution of Pt and/or Pd compounds; or (less preferably) the Pt and/or Pd containing solution is sprayed onto the support material. The ratio of Pt and/or Pd containing solution to support material generally is such that the final catalyst obtained in step (c) or, alternatively, the coating of the material obtained in (E), i.e., the material obtained in step (E) excluding the monolith, contains about 0.5 to about 5, preferably about 1 to about 3, weight-% Pt or Pd. When a solution containing both Pt and Pd compounds, the level of Pt and Pd generally is about 0.5 to about 5, preferably about 1 to about 3, weight percent (Pt+Pd).

In a preferred embodiment, at least one compound of a metal selected from the group of Re, Fe, Ru, Cu, Ag, Sm and Eu, more preferably Fe, is also present as a copromoter in the impregnating solution besides at least one Pt compound. Non-limiting examples of suitable Fe compounds that can be used as solutes are $FeCl_2$, $FeCl_3$, $Fe_2(SO_4)_3$, $Fe(NO_3)_2$, $Fe(NO_3)_3$ and the like, preferably compounds of Fe in the valence state +3, more preferably $Fe(NO_3)_3$. Non-limiting examples of Mn compounds are $MnCl_2$, $MnSO_4$, $Mn(NO_3)_2$, $KMnO_4$, and the like. Non-limiting examples of Ru compounds are $RuCl_3$, $RuF_4$, $Ru(NH_3)_6Cl_3$, $KRuO_4$, and the like. Non-limiting examples of Cu compounds are $CuCl_2$, $Cu(NO_3)_2$, $CuSO_4$, Cu(II) acetate, ammine complexes of the above Cu salts, and the like. Non-limiting examples of Ag compounds are $AgF$, $AgNO_3$, $Ag_2SO_4$, Ag acetate, ammine complexes of the above Ag salts, and the like. Non-limiting examples of Sm compounds are $SmCl_3$, $Sm(NO_3)_3$, $Sm_2(SO_4)_3$, and the like. Non-limiting examples of Eu compounds are $EuCl_3$, $Eu(NO_3)_3$, $Eu_2(SO_4)_3$ and the like.

Generally, the concentration of the copromoter compound (expressed as metal) is in the range of from about 0.01 to about 0.4, preferably about 0.02 to about 0.2, g metal (i.e., Mn of Fe or Ru or Cu or Ag or mixtures thereof) per cc solution. When a mixture of copromoter compounds is used, e.g., a mixture of compounds of Fe and Ru, Fe and Ag, Ru, Cu, Sm and Eu, Fe/Ru/Ag, and the like, the total concentration of copromoter metals is about 0.02–0.8 g/cc. The impregnation of the support material with Pt and/or Pd and the copromoter can be carried out either by sequential impregnation (first Pt or Pt+Pd, then copromoter; or vice versa), or by simultaneous impregnation in step (a) or step (C) (i.e., using a solution containing compounds of Pt or Pt+Pd and of at least one copromoter compound).

When sequential impregnation is employed, the impregnation with a solution of at least one copromoter compound is carried out after heating step (b) and before step (c); or, if applicable, after heating step (D) and before step (E). Thus, an impregnating step (a*) with at least one dissolved copromoter compound and heating step (b*) [carried out in substantially the same manner as step (b)] are performed after step (b) and before step (c). Similarly, an impregnation step (C*) with at least one dissolved copromoter compound and heating step (D*) [carried out in substantially the same manner as step (D)] are performed after step (D) and before step (E). The ratio of copromoter containing solution to support material is such as to provide a level of about 0.2 to about 4, preferably about 0.5–2, weight percent copromoter metal (i.e., Re or Fe or Ru or Cu or Ag or, Sm or Eu, or mixtures of two or more metals, (e.g., Fe/Ag, and the like) on the material obtained in step (c) or, alternatively, on the material obtained in step (E), excluding the porous ceramic material (preferably monolith).

Preferably compounds of Cr, Mn and Zn should be substantially absent from the impregnating solutions used in impregnation steps (a), (a*), (C) and (C*) since these compounds have a detrimental effect on the activity for CO oxidation of the finished catalyst.

Heating step (b) is generally carried out in an inert or oxidizing atmosphere, preferably a free oxygen containing gas atmosphere (such as air), generally at a temperature ranging from about 30° to about 700° C. Preferably, heating step (b) is carried out in two sequential sub-steps: sub-step (b1), at about 30° to about 200° C. (preferably at 80°–130° C.), generally for about 0.5 to about 10 hours, so as to substantially dry the impregnated material obtained in step (a) (preferably under such conditions as to reduce the level of adhered and accluded water to less than about 20 weight-%); and sub-step (b2), at about 300° to about 700° C. (preferably about 400° to about 600° C.), generally for about 1 to about 20 hours, under such conditions as to substantially calcine the impregnated support material so as to obtain oxides of Pt and/or Pd, on titania. When compounds of Re, Fe, Ru, Cu, Ag, Sm, Eu or mixtures thereof have been present in the Pt and/or Pd-containing impregnating solution, generally oxides of Re, Fe, Ru, Cu, Ag, Sm, Eu or mixtures are formed in step (b2).

Drying sub-steps (b*1), (D1) and (D*1), described above, are carried out at conditions which are essentially the same as those described for sub-step (b1). And calcining sub-steps (b*2), (D2) and (D*2), described above, are carried out at conditions which are essentially the same as those described for sub-step (b2).

Reducing step (c) can be carried out in any suitable manner at a temperature in the range of from about 300° to about 800° C., preferably from about 350° to about 500° C. Reducing step (E) can be carried out in any suitable manner at a temperature in the range of from about 0° to about 300° C., preferably about 20° to about 200° C. Any reducing gas can be employed in reducing steps (c) and (E), such as a gas comprising $H_2$, CO, gaseous hydrocarbons such as methane, mixtures of the above, and the like. Preferably, a free hydrogen containing gas, more preferably substantially pure $H_2$, is employed. Reducing steps (c) and (E) can be carried out for any suitable period of time suitable to activate the calcined material obtained in the previous step, preferably from about 0.5 to about 20 hours. Pt and/or Pd exist substantially as Pt and/or Pd metal after reducing steps (c) and (E), respectively. However, small amounts of oxides of Pt and/or Pd may also be present.

The process for oxidizing a carbon monoxide containing feed gas can be carried at any suitable temperature and pressure conditions, for any suitable length of time, at any suitable gas hourly space velocity, and any suitable volume ratio of CO and $O_2$. The reaction temperature generally is in the range of from about −50° to about 400° C., preferably from about −30° to about 170° C., more preferably from about 10 to about 50° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of $O_2$ in the feed gas can each be in the range of from about 0.05 to about 50, preferably from about 0.5 to about 3. The gas hourly space velocity (cc feed gas per cc catalyst per hour) can be in the range of from about 0.5 to about 10,000, preferably from about 1 to about 1,000. It is understood that the calculation of the gas hourly space velocity is based on the volume of the active catalyst i.e., the titania-supported Pt and/or Pd catalyst (optionally also containing copromoter), excluding the volume occupied by any additional support material, such as a monolith material.

The feed gas can be formed in any suitable manner, e.g., by mixing CO, $O_2$ and optionally other gases such as $CO_2$, $N_2$, He and the like, such as in a carbon dioxide laser cavity. Or the feed gas can be an exhaust gas from a combustion engine, or it can be air that is to be inhaled by humans and contains undesirable levels of toxic carbon monoxide, and the like. The feed gas can be contacted in any suitable vessel or apparatus, such as in a laser cavity or in an exhaust pipe of a combustion engine, or in a gas mask used by humans, wherein the feed gas passes over the catalyst composition of this invention at the conditions described above. The CO oxidation process of this invention can be carried out in any suitable setting and for any purpose, e.g., for recombining CO and $O_2$ in $CO_2$ lasers, to oxidize CO contained in exhaust gases or air, to make isotopically labeled $CO_2$ from CO and the $^{18}_8O$ isotope, and the like.

The following examples are presented in further illustration of the invention and are not to be construed as unduly limiting the scope of the invention.

EXAMPLE I

This example illustrates the experimental setup for testing the activity of noble metal catalysts for catalyzing the oxidation of carbon monoxide (so as to simulate catalytic recombination of CO and $O_2$ in $CO_2$ lasers). A gaseous feed blend comprising CO, $O_2$, He and $N_2$ was passed through a needle valve and a glass reactor in an upflow direction. The glass reactor tube had an inner diameter of about 6 mm and generally contained about 1.0 gram catalyst in a bed of about 2.5 cm height. The temperature in the catalyst bed was measured by means of a thermocouple inserted into the top layer of the catalyst bed. The CO content in the reactor effluent was determined by means of a Beckman Model 864 IR analyzer.

All tests were carried out at ambient conditions. Generally the temperature in the catalyst bed rose to about 30° C. because of the generation of heat during the CO oxidation tests. The feed rate of the gaseous feed stream generally was in the range of about 4–300 cc/minute.

EXAMPLE II

This example illustrates the preparation of titania-supported catalyst compositions and their performance in CO oxidation tests.

Catalyst A1 contained 1 weight-% Pt on $TiO_2$. It was prepared by mixing, at room temperature, 30 g of flame-hydrolyzed titania (provided by Degussa Corporation, Teterboro, NJ; having a BET/$N_2$ surface area of about 50 m$^2$/g) with 31 cc of aqueous chloroplatinic acid solution, which contained 0.0096 g Pt/cc solution, and enough distilled water to form a thick paste. After impregnation, Catalyst A1 was dried at about 125° C. for several hours and calcined in air at about 350° C. for about 6 hours. Catalyst A1 was then pretreated with hydrogen gas for about 4 hours at various temperatures (range: 200°–725° C.)

Figure 1:
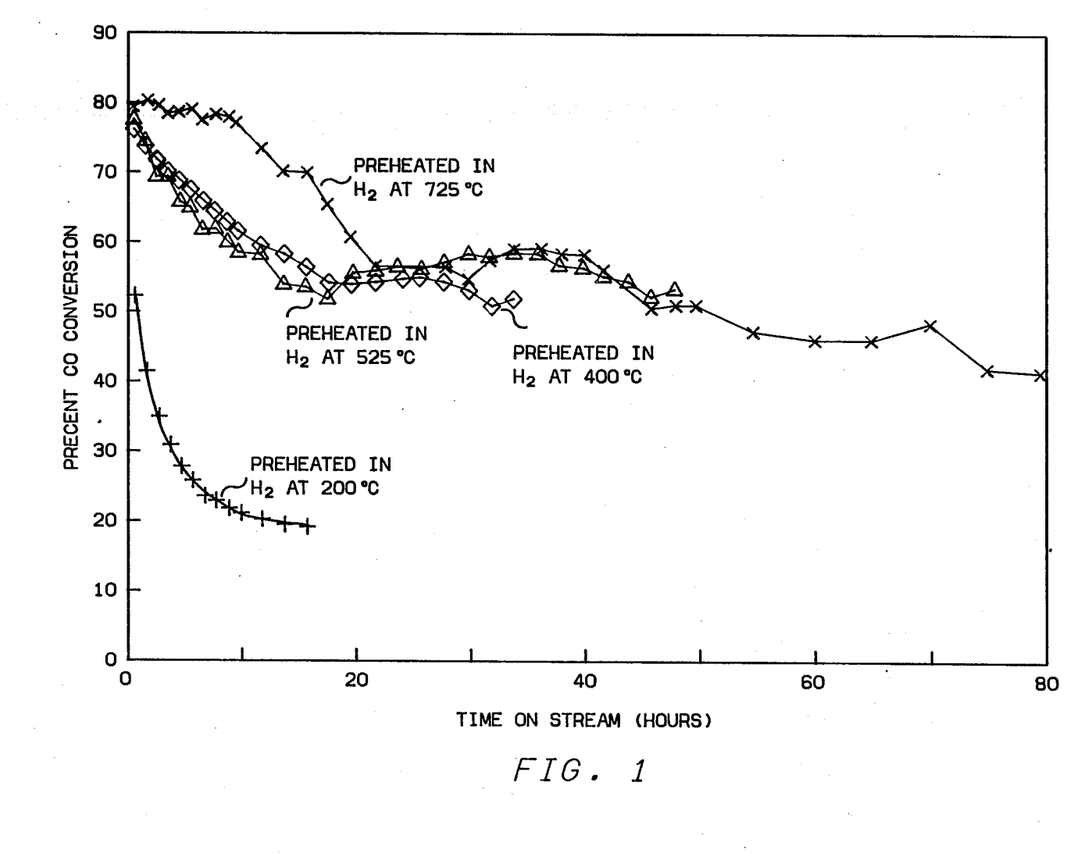
FIG. 1 shows the CO conversion, during oxidation of CO at low temperature, as a function of the temperature during the reducing pretreatment of a $Pt/TiO_2$ catalyst with $H_2$.

Samples of catalyst A1 (1% Pt/$TiO_2$) that had been pretreated with $H_2$ at different temperatues was tested at room temperature (about 27° C.) in the CO oxidation unit described in Example I. The gaseous feed blend contained 1.2 volume-% CO, 0.6 volume-% $O_2$, 40.7 volume-% $N_2$ and 57.5 volume-% He. The feed rate was 10 cc/minute. The correlation between CO conversion and the temperature of the hydrogen pretreatment temperature of Catalyst A1 is shown in FIG. 1. FIG. 1 shows that $H_2$ pretreatment of the Pt/$TiO_2$ catalyst at temperatures in the range of 400° to 725° C. resulted in a considerably more active CO oxidation catalyst than $H_2$ pretreatment at 200° C.

Catalyst A2 contained 1 weight-% Pt and 0.3 weight-% Pd on $TiO_2$, and was prepared by mixing 30 g Catalyst A1 with 100 cc of an aqueous solution containing 0.25 g tetramminepalladinum(II) nitrate, drying and calcining the obtained paste as described for Catalyst A1. The calcined Catalyst A2 material was then activated by heating with $H_2$ at 725° C. for 16 hours. CO conversion (measured as described for the tests employing Catalyst A1) was 100% for about 126 hours. Thus, Pd enhanced the CO oxidation activity of the Pt/$TiO_2$ catalyst.

EXAMPLE III

This example illustrates the effects of various other copromoters on the CO oxidation activity of a Pt/$TiO_2$ catalyst which contained 2 weight-% Pt (labeled Catalyst B1) and was prepared substantially in accordance with the procedure for Catalyst A1, except that the Pt concentration in the impregnating solution was thrice as high, and the $TiO_2$ support material was provided by Calsicat (division of Mallinckrodt, Inc., St. Louis, MO) and had a BET surface area of about 40–170 m$^2$/g.

Catalyst B1 was then mixed with aqueous solutions containing different metal compounds so as to provide a copromoter level of 0.8 weight-% of the metal. A solution of tetramminepalladinum(II) nitrate was used to make Catalyst B2 (0.8% Pd/2% Pt/$TiO_2$). A solution of $RuCl_3.3H_2O$ was used to make Catalyst B3 (0.8% Ru/2% Pt/$TiO_2$). A solution of $ReCl_3$ was used to make Catalyst B4 (0.8% Re/2% Pt/$TiO_2$). A solution of hexamminechloroiridium(II) dichloride was used to make Catalyst B5 (0.8% Ir/2% Pt/$TiO_2$). A solution of $Cu(NO_3)_2.2.5H_2O$ was used to make Catalyst B6 (0.8% Cu/2% Pt/$TiO_2$). A solution of $Fe(NO_3)_3.9H_2O$ was used to make Catalyst B7 (0.8% Fe/2% Pt/$TiO_2$).

Figure 2:
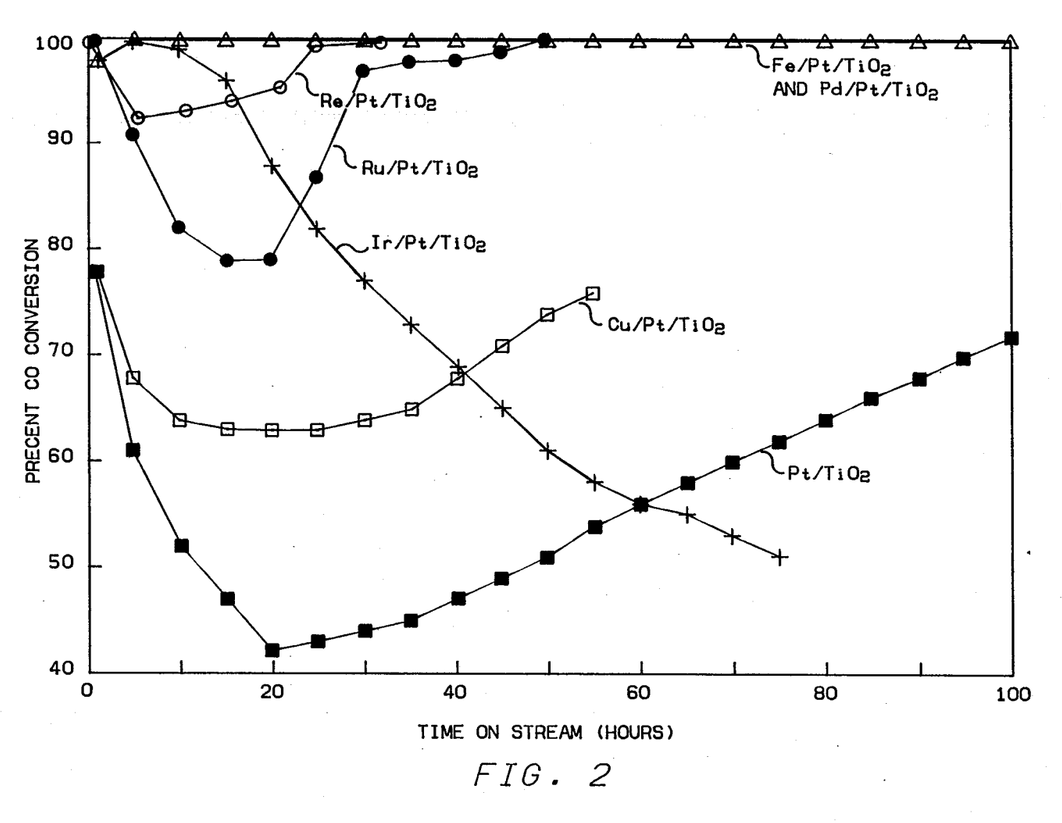
FIG. 2 illustrates the effect of copromoters on the catalytic activity of a $Pt/TiO_2$ catalyst when used for low temperature oxidation of CO.

CO conversions attained at room temperature (about 27° C.) in the test unit of Example I employing a gas feed containing 1.2 volume-% CO, 0.6 volume-% $O_2$, 48 volume-% $N_2$ and He as the balance (flow rate of feed: 10 cc/minute), are shown for Catalysts B1, B2, B3, B4, B5, B6 and B7 in FIG. 2. All catalysts had been pretreated with hydrogen gas for 3 hours at 600° C.

The graphs in FIG. 2 indicate that Fe, Pd, Re, Ru and Cu consistently enhanced the CO oxidation activity of the Pt/$TiO_2$ base catalyst, whereas Ir enhanced the CO oxidation activity of the base catalyst only up to 60 hours on stream. Additional test data (not shown in FIG. 2) indicated that Rh did not affect the catalytic activity of the Pt/$TiO_2$ base catalyst. Fe, Pd and Re were the most effective copromoters for the Pt/$TiO_2$-containing CO oxidation catalyst.

Figure 3:
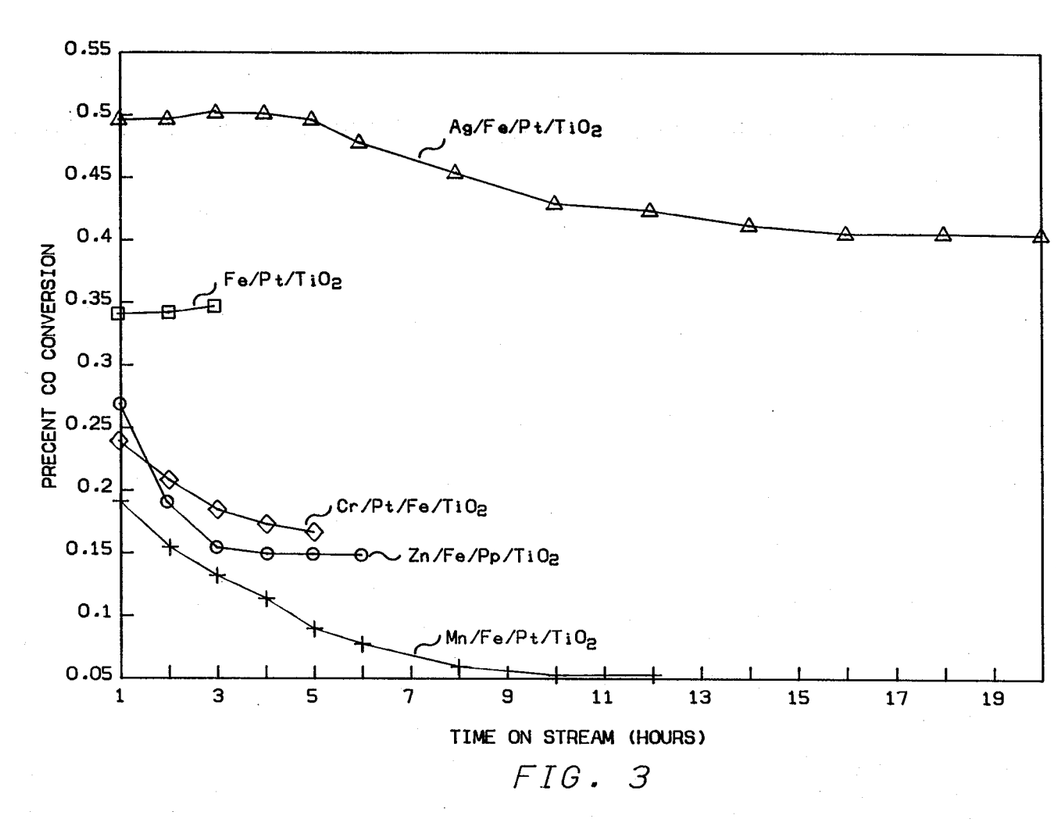
FIG. 3 illustrates the effect of copromoters on the catalytic activity of a $Pt/Fe/TiO_2$ catalyst when used for low temperature oxidation of CO.

In another test series, a $TiO_2$-supported catalyst containing 0.4 weight-% Fe and 2.0 weight-% Pt, labeled Catalyst B8, was prepared substantially in accordance with the procedure for Catalyst B7, except for a lower Fe level. Catalyst B8 was then impregnated with an aqueous solution containing a compound of a third promoter metal, so as to obtain Catalysts B9, B10, B11 and B12, respectively, containing 0.1 weight-% of the following third promoter elements: Mn, Cr, Ag and Zn. Carbon monoxide conversions, attained by Catalysts B8, B9, B10 and B11 at room temperature (about 27° C.) in the test unit of Example I employing the gas feed described in Example II are shown in FIG. 3. The gas feed rate was 60 cc/minute (in lieu of 10 cc/minute). All catalysts had been pretreated in hydrogen gas for 3 hours at about 500° C. The $TiO_2$ support had been heated in $H_2$ for about 48 hours at 500° C. before impregnation with the promoters (Fe, Pt + third promoter) for removal of traces of sulfur in $TiO_2$.

The graphs in FIG. 3 indicate that Ag enhanced the activity of the $Fe/Pt/TiO_2$ CO oxidation catalyst, whereas the presence of Mn, Cr and Zn was detrimental. Based on these test results, it is concluded that Ag is also an effective promoter for a $Pt/TiO_2$-containing catalyst (with or without Fe).

EXAMPLE IV

This example illustrates a preferred feature of the preparation of $TiO_2$-supported Pt catalysts useful for CO oxidation at low temperature. Two catalysts containing 0.5 weight-% Fe, and 2.0 weight-% Pt on Calsicat $TiO_2$ support were tested. Catalyst C1 was prepared substantially in accordance with the preparation of Catalysts B7 and B8, using an aqueous solution of chloroplatinic acid. Catalyst C2 was prepared as described above except that the dissolved Pt compound was tetrammineplatinum(II) nitrate. The two catalysts were dried, calcined and pretreated with hydrogen gas at 500° C. for about 3 hours, as has been described in Examples II and III. X-ray diffraction test results indicated that Pt existed in Catalyst C substantially as metallic Pt.

The two catalysts were tested at room temperature (about 26° C.) in the CO oxidation test unit described in Example I, employing the gas feed described in Example III. The gas feed rate was 120 cc/minute. Test results are summarized in Table I.

TABLE I

| Catalyst | Hours on Stream | % CO Converted | cc/Minute CO Converted |
| --- | --- | --- | --- |
| C1 | 2 | 60 | 0.84 |
| | 6 | 56 | 0.78 |
| | 10 | 56 | 0.78 |
| | 14 | 55 | 0.77 |
| | 20 | 55 | 0.77 |
| | 30[1] | 50 | 0.70 |
| | 40[1] | 44 | 0.62 |
| C2 | 2 | 63 | 0.89 |
| | 6 | 70 | 0.98 |
| | 10 | 78 | 1.09 |
| | 20 | 89 | 1.25 |
| | 30 | 94 | 1.32 |
| | 40 | 92 | 1.30 |
| | 50 | 92 | 1.30 |
| | 60 | 90 | 1.26 |
| | 70 | 91 | 1.27 |

[1]Temperature had dropped to 23° C.

Test results in Table I clearly show that the $Fe/Pt/TiO_2$ catalyst prepared using a chloride-free Pt compound for impregnation (Catalyst C2) was consistently more active for CO oxidation than Catalyst C1, which had been prepared using a chloride-containing Pt compound for impregnation.

EXAMPLE V

This example illustrates how the CO oxidation activity of a $TiO_2$-supported catalyst can be enhanced by pretreatment of the $TiO_2$ support.

25 grams of flame-hydrolyzed titania (provided by Degussa Corporation; see Example II) was stirred overnight in a mixture of 200 cc concentrated $H_2SO_4$ and 300 cc deionized water. The aqueous slurry of titania was then neutralized with a concentrated ammonia solution. The dispersed titania was allowed to settle, and the supernatant solution was decanted. The thus treated titania was washed four times with deionized water and dried in a circulating air oven (80°–90° C.; 5 hours).

5 grams of the acid-treated $TiO_2$ was impregnated with 3 cc of an aqueous solution of $Pt(NH_3)_4(NO_3)_2$ (containing 0.033 g Pt per cc) and then with 2.5 cc of an aqueous solution of $Fe(NO_3)_3$ (containing 0.01 g Fe per cc). The thus impregnated material was dried, calcined and pretreated with hydrogen gas for 3 hours at 500° C. This catalyst, labeled Catalyst D, contained 2 weight-% Pt and 0.5 weight-% Fe.

Catalyst D was compared to Catalyst C2 (see Example IV) which had been prepared without acid treatment of titania (provided by Degussa Corporation). The two catalysts were tested at room temperature (27°–29 C.) in the CO oxidation test unit described in Example I, employing the gas feed described in Example III. Test results are summarized in Table II.

TABLE II

| Catalyst | Gas Feed Rate (cc/min.) | Hours on Stream | % CO Converted | cc/Minute CO Converted |
| --- | --- | --- | --- | --- |
| D | 160 | 2 | 58 | 1.09 |
| ($TiO_2$ Support | " | 4 | 65 | 1.22 |
| Acid-Treated) | " | 6 | 68 | 1.28 |
| | " | 10 | 68 | 1.28 |
| | " | 14 | 68 | 1.28 |
| | " | 18 | 67.5 | 1.26 |
| | " | 22 | 67.5 | 1.26 |
| C2 | 120 | 2 | 56 | 0.79 |
| ($TiO_2$ Support | 120 | 4 | 48 | 0.67 |
| Not Acid- | " | 6 | 43 | 0.60 |
| Treated) | " | 10 | 41 | 0.58 |
| | " | 14 | 41 | 0.58 |
| | " | 18 | 42 | 0.59 |

Data in Table II clearly indicate that the CO conversion was greater for Catalyst D as compared to Catalyst C2 in spite of the higher gas feed rate of the run with Catalyst D. The conversion of CO, expressed in cc CO converted per minute, attained by Catalyst D was about twice that attained by Catalyst C2.

Thus, in the presently preferred catalyst preparation method of this invention, the $TiO_2$ support material is treated with an aqueous acid solution, followed by neutralization and washing, before the $TiO_2$ support material is impregnated with promoters, dried, calcined and heated in $H_2$ gas.

EXAMPLE VI

This example illustrates the use of honeycomb ceramic catalyst supports, called monoliths, for preparing $Pt/TiO_2$-containing catalysts employed in the oxidation of carbon monoxide. The two best modes of preparation of these honeycomb catalysts are described in this example.

Mode A: A round piece of Celcor® Cordierite #9475 monolith ceramic material $2MgO.2Al_2O_3.5SiO_2$; provided by Corning Glass Works, Corning, NY; diameter: 1 inch; height: 1 inch; having 100 cells per square inch) was dried for 2 hours at 185° C., and was then dipped about 7 times into a stirred suspension of 30 grams flame-hydrolyzed $TiO_2$ (Degussa Corporation) in 250 cc distilled water. The material was dried after each dipping. This $TiO_2$-coated monolith material was calcined in air for 4 hours at 500° C. The calcined $TiO_2$-coated monolith material was then dipped into an aqueous solution of choroplatinic acid (containing 0.022 g Pt/cc), dried for 1 hour at 300° C., dipped into an aqueous solution of $Fe(NO_3)_3$ (containing 0.01 g Fe/cc) and dried again for 1 hour at 300° C. The $Fe/Pt/TiO_2$-monolith catalyst, labeled Catalyst E1, was pretreated in hydrogen gas for 3 hours at 500° C. and then heated in helium gas at that temperature for 30 minutes. The impregnation with Pt and Fe, drying and pretreating with $H_2$ was repeated.

Catalyst E1 was tested in a CO oxidation apparatus at room temperature (about 26° C.) in an apparatus similar to the one described in Example I, except that a glass reactor tube of 1 inch inner diameter was used. The feed gas employed was essentially the same as the one described in Example III. Test results are summarized in Table III.

TABLE III

| Hours on Stream | Gas Feed Rate (cc/min.) | % CO Conversion | cc/Minute CO Converted |
|---|---|---|---|
| 4 | 10 | 99 | 0.12 |
| 10 | 10 | 99 | 0.12 |
| 18 | 10 | 99 | 0.12 |
| 20 | 30 | 96 | 0.34 |
| 24 | 30 | 96 | 0.34 |
| 30 | 60 | 91 | 0.64 |
| 40 | 60 | 80 | 0.56 |
| 50 | 60 | 72 | 0.50 |
| 60 | 60 | 66 | 0.46 |
| 70 | 60 | 58 | 0.41 |
| 80 | 60 | 60 | 0.42 |
| 90 | 60 | 58 | 0.41 |
| 100 | 60 | 56 | 0.40 |
| 110 | 60 | 55 | 0.38 |

Mode B: The presently best mode for preparing honeycomb-type $Pt/TiO_2$-containing catalysts is as follows. A piece of Cordierite 9475 monolith material (diameter: 1 inch; height: 1 inch) was dipped into a colloided solution of $TiO_2$ in water (provided by Nalco; containing about 6 weight-% $TiO_2$ having an average particle diameter of 2 microns). The monolith piece was dipped 9 times into the colloidal $TiO_2$ solution. The thus impregnated piece was dried at 150° C. after each dipping. The $TiO_2$-coated monolith was then dipped into an aqueous $Pt(NH_3)_4(NO_3)_2$ solution (containing 0.33 g/cc Pt), dried, calcined in air for 2 hours at 300° C., and pretreated in $H_2$ gas after 1 hour at room temperature (25° C.). The coating of the thus-prepared catalyst, labeled Catalyst E2, contained about 3 weight-% Pt and about 97 weight-% $TiO_2$.

Catalyst E3 was prepared by dipping E2 into an aqueous solution of $Fe(NO_3)_3$ (containing 0.01 g Fe per cc), drying, calcining in air for 2 hours at 300° C., and pretreating in $H_2$ for 1 hour at room temperature. The coating of Catalyst E2 contained about 3 weight-% Pt, about 1 weight-% Fe and 96 weight-% $TiO_2$.

Catlayst E4 was prepared by dipping E3 into an aqueous solution of $Pd(NH_3)_4(NO_3)_2$ (containing 0.04 g Pd per cc), calcining in air for 2 hours at 300° C., and pretreating with $H_2$ for 1 hour at room temperature.

Catalysts E2, E3 and E4 were tested in the experimental setup described for the CO oxidation run employing Catalyst E1. The gas feed rate for all runs was 300 cc/minute. Test results are summarized in Table IV.

TABLE IV

| Catalyst | Hours on Stream | % CO Conversion | cc/Minute CO Converted |
|---|---|---|---|
| E2 | 1 | 9.4 | 0.33 |
|  | 2 | 8.5 | 0.30 |
|  | 4 | 4.3 | 0.15 |
| E3 | 1 | 74 | 2.61 |
|  | 2 | 69 | 2.43 |
|  | 4 | 60 | 2.10 |
|  | 6 | 58 | 2.04 |
|  | 10 | 54 | 1.89 |
|  | 14 | 51 | 1.80 |
|  | 20 | 47 | 1.65 |
| E4 | 1 | 93 | 3.27 |
|  | 2 | 83 | 2.91 |
|  | 4 | 73 | 2.55 |
|  | 6 | 69 | 2.43 |
|  | 10 | 55 | 1.92 |
|  | 14 | 47 | 1.65 |
|  | 20 | 33 | 1.17 |

Test results in Table IV indicate that high CO conversions (cc CO/minute) were attained at high gas feed rates (300 cc/minute; higher than in any previous run). Thus the monolith-supported catalysts E2-E4, prepared by impregnation with colloidal $TiO_2$, are considered the presently best $TiO_2$-supported CO oxidation catalysts.

A run not listed in Table IV employing a catalyst similar to Catalyst E3, except that 0.6 weight-% Mn was prepared in the coating in lieu of 1 weight-% Fe, gave CO conversions of only about 33% and about 1.2 cc CO/minute during the first 5 hours. Thus, $Mn/Pt/TiO_2$ catalysts are not considered more preferred catalysts of this invention.

A particular advantage of the monolith-supported $Pt/TiO_2$-containing catalysts E2-E4 is that they could be activated by pretreatment in $H_2$ at a low temperature (about 25° C.), whereas the catalysts used in previous examples required pretreatment in $H_2$ at an elevated temperature (e.g., 400°-500° C.). In fact, reheating Catalyst E4 for 3 hours in air at 500° C. and then for 1 hour in hydrogen at 400° C. made this catalyst substantially inactive for CO oxidation.

EXAMPLE VII

A test employing a catalyst, which contained 1 weight-% Pt on $SiO_2$ and had been pretreated in $H_2$ at 660° C. for about 1 hour, showed no activity for catalyzing the oxidation of CO at room temperature. Thus, $SiO_2$ should be substantially absent from the catalyst of this invention.

EXAMPLE VIII

This example illustrates the effect of two lanthanides on the performance of a $Pt/TiO_2$ catalyst.

Catalyst F1 (2.0 weight-% Pt on $TiO_2$) was prepared by impregnating 3/16" pellets of Calsicat titania (see Example II) with a first portion of an aqueous solution of $Pt(NH_3)_4(NO_3)_2$ comprising 0.02 g Pt/cc solution, followed by drying at 125° C., impregnating with the second portion of the impregnating solution, again followed by drying at 125° C., and finally calcined in air at 300° C. for 3 hours.

Two gram samples of Catalyst F1 were now impregnated with 1 cc of an aqueous lanthanide promoter solutions. Catalyst F2 (0.7 weight-% Sm and 2.0 weight-% Pt on $TiO_2$) was prepared by impregnating F1 with 1 cc of an aqueous solution of $Sm(NO_3)_3$ containing 0.14 g Sm, and drying. Catalyst F3 (0.7 weight-% Eu and 2.0 weight-% Pt on $TiO_2$) was prepared by impregnating F1 with an aqueous solution of $Eu(NO_3)_3$ containing 0.14 g Eu, and drying.

Catalyst F1, F2, and F3 were calcined in air at 400° C. for two hours and then heated in hydrogen gas at 200° C. for 1.5 hours. The activity of Catalyst F1 through F4 was determined in the CO oxidation test apparatus described in Example I. The feed gas contained 1.25 volume-% CO, 0.6 volume-% $O_2$, 32 volume-% $CO_2$, 32 volume-% He, and $N_2$ as the balance. Test results are summarized in Table V.

TABLE V

| Catalyst | Hours on Stream | Temp. (°C.) | Feed Rate (cc/minute) | % CO Conversion | CC/Minute CO Converted* |
|---|---|---|---|---|---|
| F1 | 1 | 24 | 20 | 16 | 0.04 |
| (Pt/ | 2 | 50 | 20 | 29 | 0.07 |
| $TiO_2$) | 3 | 100 | 30 | 94 | 0.35 |
|  | 4 | 100 | 30 | 93 | 0.35 |
|  | 6 | 100 | 30 | 91 | 0.34 |
|  | 8 | 100 | 30 | 91 | 0.34 |
|  | 10 | 100 | 30 | 91 | 0.34 |
|  | 12 | 100 | 30 | 92 | 0.35 |
|  | 14 | 100 | 30 | 92 | 0.35 |
|  | 16 | 100 | 30 | 93 | 0.35 |
|  | 18 | 100 | 30 | 93 | 0.35 |
| F2 | 1 | 24 | 30 | 16 | 0.06 |
| (Sm/Pt/ | 2 | 50 | 30 | 27 | 0.10 |
| $TiO_2$) | 3 | 100 | 87 | 67 | 0.75 |
|  | 4 | 100 | 87 | 72 | 0.78 |
|  | 6 | 100 | 87 | 72 | 0.78 |
|  | 8 | 100 | 87 | 72 | 0.78 |
|  | 10 | 100 | 87 | 72 | 0.78 |
|  | 12 | 100 | 87 | 72 | 0.78 |
|  | 14 | 100 | 87 | 72 | 0.78 |
|  | 16 | 100 | 87 | 72 | 0.78 |
|  | 18 | 100 | 87 | 72 | 0.78 |
| F3 | 1 | 24 | 20 | 18 | 0.04 |
| (Eu/Pt/ | 2 | 50 | 20 | 25 | 0.06 |
| $TiO_2$) | 3 | 100 | 65 | 79 | 0.64 |
|  | 4 | 100 | 65 | 77 | 0.62 |
|  | 6 | 100 | 65 | 75 | 0.61 |
|  | 8 | 100 | 65 | 73 | 0.59 |
|  | 10 | 100 | 65 | 71 | 0.58 |
|  | 12 | 100 | 65 | 70 | 0.57 |
|  | 14 | 100 | 65 | 68 | 0.55 |
|  | 16 | 100 | 65 | 68 | 0.55 |
|  | 18 | 100 | 65 | 68 | 0.55 |

*per gram catalyst

Based on the test results in Table V, it is concluded that Sm and Eu (as oxides) were effective as copromoters for a Pt/$TiO_2$ CO oxidation catalyst. Sm/Pt/$TiO_2$ was more active than Eu/Pt/$TiO_2$, under the testing conditions of this example.

EXAMPLE IX

This example illustrates the performance of several Pd/$TiO_2$ CO oxidation catalysts.

Catalyst G1 (2.0 weight-% Pd on $TiO_2$) was prepared in accordance with the procedure for Catalyst F1 except that an aqueous solution of $Pd(NH_3)_4(NO_3)_2$ comprising 0.02 g Pd/cc solution was used in lieu of the $Pt(NH_3)_4(NO_3)_2$ solution.

Catalyst G2 (0.7 weight-% Cr and 2.0 weight-% Pd on $TiO_2$) was prepared by impregnating 2 grams of G1 with 2 cc of an aqueous solution chromium salt solution containing 0.007 g Cr per cc solution. Catalyst G3 (0.7 weight-% Mn and 2.0 weight-% Pd on $TiO_2$) was prepared by impregnating 2 grams of G1 with 1.4 cc of an aqueous manganese salt solution containing 0.01 g Mn per cc solution. Catalyst G4 (0.7 weight-% Ni and 2.0 weight-% Pd on $TiO_2$) was prepared by impregnating 2 grams of G1 with 2.0 cc of an aqueous nickel salt solution containing 0.007 g Ni per cc solution. Catalyst G5 (0.7 weight-% Fe and 2.0 weight-% Pd on $TiO_2$) was prepared by impregnating 2.0 grams of G1 with 1.2 cc of an aqueous iron salt solution containing 0.012 g Fe per cc solution. Catalyst G6 (0.7 weight-% Ag and 2.0 weight-% Pd on $TiO_2$) was prepared by impregnating 2 grams of G1 with 2 cc of an aqueous silver salt solution containing 0.007 g Ag per cc solution.

The above-described preparation of G2 through G6 was carried out by impregnating 2 grams of G1 with ½ of the metal salt solution, followed by drying at 125° C. for 1 hour, impregnating with the second half of the metal salt solution, and again followed by drying at 125° C. for 1 hour. Catalysts G1–G6 were calcined in air at 400° C. for 1 hour, and then heated in hydrogen gas at 200° C. for 2 hours, before the catalysts were used in CO oxidation tests (as discussed in Example VIII). Test results are summarized in Table VI.

TABLE VI

| Catalyst | Hours on Stream | Temp. (°C.) | Feed Rate (cc/minute) | % CO Conversion | CC/Minute CO Converted* |
|---|---|---|---|---|---|
| G1 | 1 | 24 | 50 | 21 | 0.13 |
| (Pd/ | 2 | 50 | 70 | 79 | 0.69 |
| $TiO_2$) | 3 | 50 | 70 | 75 | 0.66 |
|  | 4 | 50 | 70 | 73 | 0.64 |
|  | 6 | 50 | 70 | 69 | 0.60 |
|  | 8 | 50 | 70 | 66 | 0.58 |
|  | 10 | 50 | 70 | 65 | 0.57 |
|  | 12 | 50 | 70 | 64 | 0.56 |
|  | 14 | 50 | 70 | 64 | 0.56 |
|  | 16 | 50 | 70 | 64 | 0.56 |
|  | 18 | 100 | 160 | 97 | 1.94 |
|  | 20 | 100 | 160 | 96 | 1.92 |
|  | 22 | 100 | 160 | 94 | 1.89 |
|  | 24 | 100 | 160 | 93 | 1.86 |
| G2 | 1 | 24 | 40 | 16 | 0.08 |
| (Cr/Pd/ | 2 | 50 | 40 | 38 | 0.19 |
| $TiO_2$) | 3 | 50 | 40 | 32 | 0.16 |
|  | 4 | 50 | 40 | 28 | 0.14 |
|  | 6 | 50 | 40 | 26 | 0.13 |
|  | 8 | 50 | 40 | 26 | 0.13 |
|  | 10 | 50 | 40 | 26 | 0.13 |
|  | 12 | 50 | 40 | 26 | 0.13 |
|  | 14 | 50 | 40 | 26 | 0.13 |
|  | 16 | 50 | 40 | 26 | 0.13 |
|  | 18 | 100 | 73 | 59 | 0.54 |
|  | 20 | 100 | 73 | 59 | 0.54 |
|  | 22 | 100 | 73 | 59 | 0.54 |
| G3 | 1 | 24 | 40 | 49 | 0.24 |
| (Mn/Pd/ | 2 | 50 | 60 | 74 | 0.56 |
| $TiO_2$) | 3 | 50 | 60 | 71 | 0.53 |
|  | 4 | 60 | 60 | 68 | 0.51 |
|  | 6 | 50 | 60 | 63 | 0.47 |
|  | 8 | 50 | 60 | 60 | 0.45 |
|  | 10 | 50 | 60 | 57 | 0.43 |
|  | 12 | 50 | 60 | 54 | 0.40 |
|  | 14 | 50 | 60 | 51 | 0.38 |
|  | 16 | 50 | 60 | 51 | 0.38 |
|  | 18 | 100 | 80 | 95 | 0.95 |
|  | 20 | 100 | 80 | 95 | 0.95 |
| G4 | 1 | 24 | 20 | 16 | 0.04 |
| (Ni/Pd/ | 2 | 50 | 40 | 49 | 0.24 |
| $TiO_2$) | 3 | 50 | 40 | 43 | 0.22 |
|  | 4 | 50 | 40 | 40 | 0.20 |
|  | 6 | 50 | 40 | 36 | 0.18 |

TABLE VI-continued

| Catalyst | Hours on Stream | Temp. (°C.) | Feed Rate (cc/minute) | % CO Conversion | CC/Minute CO Converted* |
|---|---|---|---|---|---|
| | 8 | 50 | 40 | 34 | 0.17 |
| | 10 | 50 | 40 | 33 | 0.16 |
| | 12 | 50 | 40 | 32 | 0.16 |
| | 14 | 50 | 40 | 31 | 0.16 |
| | 16 | 50 | 40 | 30 | 0.15 |
| | 18 | 100 | 100 | 82 | 1.03 |
| | 20 | 100 | 100 | 79 | 0.99 |
| | 22 | 100 | 100 | 78 | 0.98 |
| | 24 | 100 | 100 | 78 | 0.97 |
| G5 (Fe/Pd/ $TiO_2$) | 1 | 24 | 100 | 24 | 0.24 |
| | 2 | 50 | 100 | 61 | 0.61 |
| | 3 | 50 | 100 | 55 | 0.55 |
| | 4 | 50 | 100 | 50 | 0.50 |
| | 6 | 50 | 100 | 44 | 0.44 |
| | 8 | 50 | 100 | 40 | 0.40 |
| | 10 | 50 | 100 | 38 | 0.38 |
| | 12 | 50 | 100 | 36 | 0.36 |
| | 14 | 50 | 100 | 34 | 0.34 |
| | 16 | 50 | 100 | 32 | 0.32 |
| | 18 | 100 | 160 | 75 | 1.50 |
| | 20 | 100 | 160 | 73 | 1.46 |
| | 22 | 100 | 160 | 71 | 1.42 |
| | 24 | 100 | 160 | 70 | 1.41 |
| G6 (Ag/Pd/ $TiO_2$) | 1 | 24 | 20 | 6 | 0.01 |
| | 2 | 50 | 20 | 52 | 0.13 |
| | 3 | 50 | 20 | 42 | 0.10 |
| | 4 | 50 | 20 | 30 | 0.08 |
| | 6 | 50 | 20 | 26 | 0.06 |
| | 8 | 50 | 20 | 24 | 0.06 |
| | 10 | 50 | 20 | 24 | 0.06 |
| | 12 | 50 | 20 | 24 | 0.06 |
| | 14 | 50 | 20 | 24 | 0.06 |
| | 16 | 50 | 20 | 24 | 0.06 |
| | 18 | 100 | 160 | 71 | 1.42 |
| | 20 | 100 | 160 | 66 | 1.33 |
| | 22 | 100 | 160 | 64 | 1.28 |
| | 24 | 100 | 160 | 64 | 1.28 |

*per gram catalyst

Test results summarized in Table VI show that Pd/$TiO_2$ was a very active CO oxidation catalyst and possessed a catalytic activity comparable to that of a Pt/$TiO_2$ catalyst (see Catalyst F1, Table V). Test data in Table VI also showed that, under the testing conditions of this example, none of the five copromoters (Cr, Mn, Ni, Fe and Ag) enhanced the catalystic activity of the Pd/$TiO_2$ base catalyst. The fact that Fe and Ag did not enhance the activity of Pd/$TiO_2$ is surprising because Fe and Ag were beneficial copromoters for Pt/$TiO_2$ (see FIGS. 2 and 3).

EXAMPLE X

This example illustrates the temperature dependence of the rate of the CO oxidation in the presence of a Fe/Pt/$TiO_2$ catalyst (Catalyst H: containing 0.7 weight-% Fe and 2.4 weight-% Pt on $TiO_2$). Catalyst H was prepared as follows.

1.94 grams of Fe($NO_3$)$_3$.9$H_2O$ were dissolved in 48 grams of an aqueous Pt($NH_3$)$_4$($NO_3$)$_2$ solution (containing 0.02 g Pt per cc solution). The above Fe/Pt nitrate solution was diluted with distilled water to a total volume of 60 cc. 30 cc of this diluted solution was mixed in multiple wetting steps with 40 grams of titania, with a drying step (20 minutes at 110° C.) after each wetting step. The dried impregnated material was calcined for 2 hours in air at 400° C. and then for 2 hours in $H_2$ at 400° C. Thereafter, the thus-heated Fe/Pt impregnated titania was mixed with the second 30 cc of the above-described diluted Fe/Pt nitrate solution in multiple wetting steps, with a drying step (20 minutes at 110° C.) after each wetting step. The thus dried, twice-impregnated material was calcined for 2 hours in air at 400° C. and then for hours in hydrogen gas at 200° C.

2 grams of Catalyst H were used in CO oxidation tests, in accordance with the procedure described in Example VIII. Test results are summarized in Tables VII and VIII.

TABLE VII

| Average Reaction* Temp. (°C.) | Feed Rate (cc/minute) | CC/Minute CO per g Catalyst Converted |
|---|---|---|
| 29 | 463 | 1.5 |
| 42 | 463 | 1.7 |
| 51 | 463 | 1.9 |
| 65 | 930 | 2.5 |
| 76 | 930 | 2.8 |
| 86 | 930 | 3.1 |
| 108 | 930 | 3.6 |
| 128 | 930 | 4.1 |
| 126 | 1417 | 4.2 |
| 148 | 1417 | 4.7 |
| 169 | 1417 | 6.1 |
| 28 | 505 | 2.0 |

*average of feed inlet temperature and product outlet temperature.

TABLE VIII

| Hours on Stream | Average Reaction Temp. (°C.) | Feed Rate (cc/minute) | % CO Conversion | CC/Minute CO Converted* |
|---|---|---|---|---|
| 1 | 0 | 300 | 56 | 1.05 |
| 2 | 0 | 300 | 56 | 1.05 |
| 3 | 0 | 300 | 56 | 1.05 |
| 4 | 0 | 300 | 56 | 1.05 |
| 5 | −30 | 280 | 46 | 0.81 |
| 6 | −30 | 280 | 46 | 0.80 |
| 8 | −30 | 280 | 45 | 0.78 |
| 10 | −30 | 280 | 45 | 0.78 |
| 15 | −30 | 280 | 45 | 0.78 |
| 20 | −30 | 280 | 45 | 0.78 |
| 25 | −30 | 280 | 46 | 0.80 |
| 30 | −30 | 280 | 41 | 0.71 |

*per gram catalyst, which was treated in $H_2$ at room temperature for one hour before testing.

Test results in Tables VII and VIII show that the Fe/Pt/$TiO_2$ CO oxidation catalyst was quite active at elevated temperatures (up to about 170° C.) as well as at a low temperature (as low as −30° C.).

Reasonable variations, modifications and adaptations for various usages and conditions can be made within the scope of the disclosure and the appended claims, without departing from the scope of this invention.

That which is claimed is:

1. A composition of matter consisting essentially of (i) a support material consisting essentially of titania, (ii) platinum metal and (iii) iron oxide,
   wherein said composition of matter is active as a catalyst for the oxidation of carbon monoxide with free oxygen to carbon dioxide at about 10°-50° C., and said composition of matter contains components (ii) and (iii) in amounts such that said iron oxide is effective as copromoter for said platinum metal on said support material in said oxidation at about 10°-50° C.

2. A composition of matter in accordance with claim 1 comprising about 0.5-5 weight-% Pt and about 0.2-4 weight-% Fe.

3. A composition of matter in accordance with claim 2 comprising about 1-3 weight-% Pt.

4. A composition of matter in accordance with claim 1 having been prepared by a process comprising the steps of:

(a) contacting titania with a solution comprising at least one dissolved compound of platinum and at least one dissolved compound of iron;
(b) heating the material obtained in step (a) under such conditions as to substantially dry said material obtained in step (a), to at least partially convert said at least one compound of platinum to at least one oxide of platinum, and to at least partially convert said at least one compound of iron at least one oxide of iron; and
(c) heating the material obtained in step (b) in a reducing gas atmosphere at a temperature in the range of from about 300° to about 800° C., under such conditions as to form said composition of matter.

5. A composition of matter in accordance with claim 4, wherein said reducing gas atmosphere is a free hydrogen containing gas.

6. A composition of matter in accordance with claim 4, wherein step (c) is carried out in a stream of $H_2$ at a temperature in the range of from about 350° to about 500° C., for a period of time in the range of from about 0.5 to about 20 hours.

7. A composition of matter in accordance with claim 4, wherein step (b) is carried out in two sub-steps:
(b1) heating the material obtained in step (a) at a first temperature so as to remove substantially all liquids from said material obtained in step (a), and
(b2) heating the substantially dried material obtained in step (b1) at a second temperature, which is higher than said first temperature, so as to at least partially convert said at least one compound of platinum to at least on oxide of platinum, and to at least partially convert said at least one compound of iron to at least on oxide of iron;
and wherein step (c) is carried out with the material obtained in step (b2)

8. A composition of matter in accordance with claim 7, wherein said first temperature is in the range of from about 30° to about 200° C., and said second temperature is in the range of from about 300° to about 700° C.

9. A composition of matter in accordance with claim 4, wherein said titania has been treated with an acid solution prior to step (a).

10. A composition of matter in accordance with claim 1, having been prepared by a process comprising the steps of:
(a) contacting titania with a solution comprising at least one compound of platinum;
(b) heating the material obtained in step (a) under such conditions as to substantially dry said material obtained in step (a) and to at least partially convert said at least one dissolved compound of platinum to at least on oxide of platinum;
(a*) impregnating the material obtained in step (b) with a solution comprising at least one dissolved compound of iron;
(b*) heating the material obtained in step (a*) under such conditions as to substantially dry said material obtained in step (a*), and to at least partially convert said at least one compound of iron to at least one oxide of iron; and
(c) heating the material obtained in step (b*) in a reducing gas atmosphere at a temperature in the range of from about 300° to about 800° C., under such conditions as to form said composition of matter.

11. A composition of matter in accordance with claim 10, wherein said reducing gas atmosphere is a free hydrogen containing gas.

12. A composition of matter in accordance with claim 10, wherein step (c) is carried out in a stream of $H_2$ at a temperature in the range of from about 350° to about 500° C., for a period of time in the range of from about 0.5 to about 20 hours.

13. A composition of matter in accordance with claim 10, wherein step (b) is carried out in two sub-steps:
(b1) heating the material obtained in step (a) at a first temperature so as to remove substantially all liquids from said material obtained in step (a), and
(b2) heating the substantially dried material obtained in step (b1) at a second temperature, which is higher than said first temperature, so as to at least partially convert said at least one compound of platinum to at least one oxide of platinum;
wherein step (b*) is carried out in two sub-steps:
(b*1) heating the material obtained in step (a*) at a first temperature so as to remove substantially all liquids from said material obtained in step (a*), and
(b*2) heating the material obtained in step (b*1) at a second temperature, which is higher than said first temperature, so as to at least partially convert said at least one compound of iron to at least one oxide of iron;
and wherein step (c) is carried out with a material obtained in step (b*2).

14. A composition of matter in accordance with claim 13, wherein said first temperature is in the range of from about 30° to about 200° C., and said second temperature is in the range of from about 300° to about 700° C.

15. A composition of matter in accordance with claim 10, wherein said titania has been treated with an acid solution prior to step (a).

16. A composition of matter consisting essentially of (i) a support material consisting essentially of titania-coated porous ceramic material, (ii) platinum metal, and (iii) iron oxide,
wherein said composition of matter is active as a catalyst for the oxidation of carbon monoxide with free oxygen to carbon dioxide at about 10°-50° C., and said composition of matter contains components (ii) and (iii) in amounts such that said iron oxide is effective as copromoter for said platinum metal on said support material in said oxidation at about 10°-50° C.

17. A composition of matter in accordance with claim 16 wherein said titania-coated porous ceramic material is a titania-coated monolith material.

18. A composition of matter in accordance its claim 17, comprising about 0.5-5 weight-% Pt and about 0.2-4 weight-% Fe, based on the weight of said composition of matter excluding said monolith.

19. A composition of matter in accordance with claim 16, comprising about 0.5-5 weight-% Pt and about 0.2-4 weight-% Fe, based on the weight of said composition of matter excluding said ceramic material.

20. A composition of matter in accordance with claim 16, wherein said titania-coated porous ceramic material contains about 1 to about 40 weight-% $TiO_2$.

21. A composition of matter in accordance with claim 16, wherein said titania-coated porous ceramic material is a titania-coated monolith material and comprises about 1 to about 40 weight-% $TiO_2$.

22. A composition of matter in accordance with claim 16, having been prepared by a process comprising the steps of:
(A) impregnating a porous ceramic material with a colloidal dispersion of titania in a suitable liquid dispersion medium;
(B) heating the titania-coated material obtained in step (A) so as to obtain a substantially dried titania-coated porous ceramic material;
(C) contacting the material obtained in step (B) with a solution comprising at least one dissolved compound of platinum and at least one dissolved compound of iron;
(D) heating the material obtained in step (C) under such conditions as to substantially dry the material obtained in step (C), to at least partially convert said at least one compound platinum to at least one oxide of platinum, and to at least partially convert said at least one compound of iron to at least one oxide of iron; and
(E) heating the material obtained in step (D) in a reducing gas atmosphere at a temperature in the range of from about 0° to about 300° C., under such conditions as to form said composition of matter.

23. A composition of matter in accordance with claim 22, wherein said porous ceramic material is a monolith material.

24. A composition of matter in accordance with claim 22, wherein said reducing gas atmosphere is a free hydrogen containing gas.

25. A composition of matter in accordance with claim 22, wherein step (E) is carried out in a stream of $H_2$ at a temperature in the range of from about 20° to about 200° C., for a period time in the range of from about 0.5 to about 20 hours.

26. A composition of matter in accordance with claim 22, wherein said colloidal dispersion used in step (A) contains titania particles having an average particle diameter in the range of from about 1 to about 100 nanometers, and said liquid dispersion medium is water.

27. A composition of matter in accordance with claim 22, wherein said colloidal dispersion used in step (A) comprises about 0.1–50 weight-% $TiO_2$.

28. A composition of matter in accordance with claim 22, wherein step (D) is carried out in two sub-steps:
(D1) heating the material obtained in step (C) at a first temperature so as to remove substantially all liquids from said material obtained in step (C), and
(D2) heating the substantially dried material obtained in step (D1) at a second temperature, which is higher than said first temperature, so as to at least partially convert said at least one compound of platinum to at least one oxide of platinum, and to at least partially convert said at least one compound of iron to at least one oxide of iron;
and wherein step (E) is carried out with the material obtained in step (D2).

29. A composition of matter in accordance with claim 28, wherein said first temperature is in the range of from about 30° to about 200° C., and said second temperature is in the range of from about 300° to about 700° C.

30. A composition of matter in accordance with claim 16, having been prepared by a process comprising the steps of:
(A) impregnating a porous ceramic material with a colloidal dispersion of titania in a suitable liquid dispersion medium;
(B) heating the titania-coated material obtained in step (A) so as to obtain a substantially dried titania-coated porous ceramic material;
(C) contacting the material obtained in step (B) with a solution comprising at least one dissolved compound of platinum;
(D) heating the material obtained in step (C) under such conditions as to substantially dry the material obtained in step (C) and to at least partially convert said at least one compound of platinum to at least one oxide of platinum;
(C*) impregnating the material obtained in step (D) with a solution comprising at least one compound of iron;
(D*) heating the material obtained in step (C*) under such conditions as to substantially dry said material obtained in step (C*), and to at least partially convert said at least one compound of iron to at least one oxide of iron; and
(E) heating the material obtained in step (D*) in a reducing gas atmosphere at a temperature in the range of from about 0° to about 300° C., under such conditions as to form said composition of matter.

31. A composition of matter in accordance with claim 30, wherein said porous ceramic material is a monolith material.

32. A composition of matter in accordance with claim 30, wherein said reducing gas atmosphere is a free hydrogen containing gas.

33. A composition of matter in accordance with claim 30, wherein step (E) is carried out in a stream of $H_2$ at a temperature in the range of from about 20° to about 20° C., for a period of time in the range of from about 0.5 to about 20 hours.

34. A composition of matter in accordance with claim 30, wherein said colloidal dispersion used in step (A) contains titania particles having an average particle diameter in the range of from about 1 to about 100 nanometers, and said liquid dispersion medium is water.

35. A composition of matter in accordance with claim 30, wherein said colloidal dispersion used in step (A) comprises about 0.1–50 weight-% $TiO_2$.

36. A composition of matter in accordance with claim 30, wherein step (D) is carried out in two sub-steps:
(D1) heating the material obtained in step (C) at a first temperature so as to remove substantially all liquids from said material obtained in step (C), and
(D2) heating the substantially dried material obtained in step (D1) at a second temperature, which is higher than said first temperature, so as to at least partially convert said at least one compound of platinum to at least one oxide of platinum;
wherein step (D*) is carried out in two sub-steps:
(D*1) heating the material obtained in step (C*) at a first temperature so as to remove substantially all liquids from said material obtained in step (C*), and
(D*2) heating the substantially dried material obtained in step (D*1) at a second temperature, which is higher than said first temperature, so as to at least partially convert said at least one compound of iron to at least one oxide of iron;
and wherein step (E) is carried out with the material obtained in step (D*2).

37. A composition of matter in accordance with claim 36, wherein said first temperature is in the range of from about 30° to about 200° C., and said second temperature is in the range of from about 300° to about 700° C.

38. A composition of matter in accordance with claim 18, comprising about 1-3 weight-% Pt.

39. A composition of matter in accordance with claim 19, comprising about 1-3 weight-% Pt.

40. A composition of matter in accordance with claim 4, wherein said compound of platinum is $Pt(NH_3)_4(NO_3)_2$.

41. A composition of matter in accordance with claim 10, wherein said compound of platinum is $Pt(NH_3)_4(NO_3)_2$.

42. A composition of matter in accordance with claim 22, wherein said compound of platinum is $Pt(NH_3)_4(NO_3)_2$.

43. A composition of matter in accordance with claim 30, wherein said compound of platinum is $Pt(NH_3)_4(NO_3)_2$.

44. A composition of matter consisting essentially of (i) a support material consisting essentially of titania, (ii) platinum metal, and (iii) iron oxide;
wherein said composition of matter is active as a catalyst for the oxidation of carbon monoxide with free oxygen to carbon dioxide at about 10°-50° C., and said composition of matter contains components (ii) and (iii) in amounts such that said iron oxide is effective as copromoter for said platinum metal on said support material in said oxidation at about 10°-50° C.;
wherein said support material (a) has been prepared by a process comprising the steps of extracting said titania with an aqueous acidic solution, treating the thus extracted titania with an alkaline solution, washing the thus alkaline-treated titania with water, drying the thus washed titania, and calcining the thus dried titania at a temperature of about 200°-800° C.

45. A composition in accordance with claim 44, wherein said aqueous acidic solution is a sulfuric acid solution.

46. A composition of matter in accordance with claim 44, wherein said alkaline solution is an aqueous ammonia solution.

47. A composition of matter in accordance with claim 44, wherein said calcining is carried out for about 0.5-10 hours.

48. A composition of matter in accordance with claim 44, comprising about 0.5-5 weight-% Pt and about 0.2-4 weight-% Fe.

49. A composition of matter in accordance with claim 48, comprising about 1-3 weight-% Pt.

50. A composition of matter consisting essentially of (i) a support material consisting essentially of titania, (ii) platinum metal, (iii) iron oxide, and (iv) a material selected from the group consisting of palladium metal and silver metal;
wherein said composition of matter is active as a catalyst for the oxidation of carbon monoxide with free oxygen to carbon dioxide at about 10°-50° C.; and said composition contains components (ii), (iii) and (iv) in amounts such that component (iii) is a copromoter for component (ii) on said support material in said oxidation at about 10°-50° C., and component (iv) is a copromoter for the combination of components (ii) and (iii) on said support material in said oxidation at about 10°-50° C.

51. A composition of matter in accordance with claim 50 comprising about 0.5-5 weight-% Pt and about 0.2-4 weight-% Fe.

52. A composition of matter in accordance with claim 51 comprising about 1-3 weight-% Pt.

53. A composition of matter in accordance with claim 50, wherein component (iv) is palladium metal.

54. A composition of matter in accordance with claim 50, wherein component (iv) is silver metal.

55. A composition of matter in accordance with claim 50 having been prepared by a process comprising the steps of:
(a) contacting titania with a solution comprising at least one dissolved compound of platinum, at least one dissolved compound of iron, and at least one compound of an additional element selected from the group consisting of palladium and silver;
(b) heating the material obtained in step (a) under such conditions as to substantially dry said material obtained in step (a), to at least partially convert said at least one compound of platinum to at least one oxide of platinum, to at least partially convert said at least one compound of iron to at least one oxide of iron, and to at least partially convert said at least one compound of said additional element to at least one oxide of said additional element; and
(c) heating the material obtained in step (b) in a reducing gas atmosphere at a temperature in the range of from about 300° to about 800° C., under such conditions as to form said composition of matter.

56. A composition of matter in accordance with claim 55, wherein said reducing gas atmosphere is a free hydrogen containing gas.

57. A composition of matter in accordance with claim 55, wherein step (c) is carried out in a stream of $H_2$ at a temperature in the range of from about 350° to about 500° C., for a period of time in the range of from about 0.5 to about 20 hours.

58. A composition of matter in accordance with claim 55, wherein step (b) is carried out in two sub-steps:
(b1) heating the material obtained in step (a) at a first temperature so as to remove substantially all liquids from said material obtained in step (a), and
(b2) heating the substantially dried material obtained in step (b1) at a second temperature, which is higher than said first temperature, so as to at least partially convert said at least one compound of platinum to at least one oxide of platinum, to at least partially convert said at least one compound of iron to at least one oxide of iron, and to at least partially convert said at least one compound of said additional element to at least one oxide of said additional element.

59. A composition of matter in accordance with claim 58, wherein said first temperature is in the range of from about 30° to about 200° C., and said second temperature is in the range of from about 300° to about 700° C.

60. A composition of matter in accordance with claim 55, wherein said compound of platinum is $Pt(NH_3)_4(NO_3)_2$.

61. A composition of matter consisting essentially of (i) a support material consisting essentially of titania, (ii) platinum metal, (iii) iron oxide, and (iv) a material selected from the group consisting of palladium metal and silver metal;
wherein said composition of matter is active as a catalyst for the oxidation of carbon monoxide with free oxygen to carbon dioxide at about 10°-50° C.; and said composition contains components (ii), (iii) and (iv) in amounts such that component (iii) is a copromoter for component (ii) on said support material in said oxidation at about 10°–50° C., and component (iv) is a copromoter for the combination of components (ii) and (iii) on said support material in said oxidation at about 10°–50° C.;

wherein said support material (i) has been prepared by a process comprising the steps of extracting said titania with an aqueous acidic solution, treating the thus extracted titania with an alkaline solution, washing the thus alkaline-treated titania with water, drying the thus-washed titania, and calcining the thus-dried titania at a temperature of about 200°–800° C.

62. A composition of matter in accordance with claim 61, wherein said aqueous acidic solution is a sulfuric acid solution.

63. A composition of matter in accordance with claim 61, wherein said alkaline solution is an aqueous ammonia solution.

64. A composition of matter in accordance with claim 61, wherein said calcining is carried out for about 0.5–10 hours.

65. A composition of matter in accordance with claim 64 comprising 0.5–5 weight-% Pt and about 0.2–4 weight-% Fe.

66. A composition of matter in accordance with claim 65 comprising 1–3 weight-% Pt.

67. A composition of matter in accordance with claim 61, wherein component (iv) is palladium metal.

68. A composition of matter in accordance with claim 64, wherein component (iv) is silver metal.

69. A composition of matter consisting essentially of (i) a support material consisting essentially of titania-coated ceramic material, (ii) platinum metal, (iii) iron oxide, and (iv) a material selected from the group consisting of palladium metal and silver metal;

wherein said composition of matter is active as a catalyst for the oxidation of carbon monoxide with free oxygen to carbon dioxide at about 10°–50° C.; and said composition contains components (ii), (iii) and (iv) in amounts such that component (iii) is a copromoter for component (ii) on said support material in said oxidation at about 10°–50° C., and component (iv) is a copromoter for the combination of components (ii) and (iii) on said support material in said oxidation at about 10°–50° C.

70. A composition of matter in accordance with claim 69, wherein said titania-coated porous ceramic material is a titania-coated monolith material.

71. A composition of matter in accordance with claim 70, comprising about 0.5–5 weight-% Pt and about 0.2–4 weight-% Fe, based on the weight of said composition of matter excluding said monolith.

72. A composition of matter in accordance with claim 71 comprising about 1–3 weight-% Pt.

73. A composition of matter in accordance with claim 69 comprising about 0.5–5 weight-% Pt and about 0.2–4 weight-% Fe, based on the weight of said composition of matter excluding said ceramic material.

74. A composition of matter in accordance with claim 73 comprising about 1–3 weight-% Fe.

75. A composition of matter in accordance with claim 69, wherein said titania-coated porous ceramic material contains about 1 to about 40 weight-% $TiO_2$.

76. A composition of matter in accordance with claim 69, wherein said titania-coated porous ceramic material is a titania-coated monolith material and comprises about 1 to about 40 weight-% $TiO_2$.

77. A composition of matter in accordance with claim 69 having been prepared by a process comprising the steps of:

(A) impregnating a porous ceramic material with a colloidal dispersion of titania in a suitable liquid dispersion medium;

(B) heating the titania-coated material obtained in step (A) so as to obtain a substantially dried titania-coated porous ceramic material;

(C) contacting the material obtained in step (B) with a solution comprising at least one dissolved compound of platinum, at least one dissolved compound of iron, and at least one dissolved compound of an additional element selected from the group consisting of palladium and silver;

(D) heating the material obtained in step (C) under such conditions as to substantially dry the material obtained in step (C), to at least partially convert said at least one compound of platinum to at least one oxide of platinum, to at least partially convert said at least one compound of iron to at least one oxide of iron, and to at least partially convert said at least one compound of said additional element to at least one oxide of said additional element; and (E) heating the material obtained in step (D) in a reducing gas atmosphere at a temperature in the range of from about 0° to about 300° C. under such conditions as to form said composition of matter.

78. A composition of matter in accordance with claim 77, wherein said porous ceramic material is a monolith material.

79. A composition of matter in accordance with claim 77, wherein said reducing gas atmosphere is a free hydrogen containing gas.

80. A composition of matter in accordance with claim 77, wherein step (E) is carried out in a stream of $H_2$ at a temperature in the range of from about 20° to about 200° C., for a period of time in the range of from about 0.5 to about 20 hours.

81. A composition of matter in accordance with claim 77, wherein said colloidal dispersion used in step (A) contains titania particles having an average particle diameter in the range of from about 1 to about 100 nanometers, and said liquid dispersion medium is water.

82. A composition of matter in accordance with claim 77, wherein said colloidal dispersion used in step (A) comprises about 0.1–50 weight-% $TiO_2$.

83. A composition of matter in accordance with claim 77, wherein step (D) is carried out in two sub-steps:

(D1) heating the material obtained in step (C) at a first temperature so as to remove substantially all liquids from said material obtained in step (C), and (D2) heating the substantially dried material obtained in step (D1) at a second temperature, which is higher than said first temperature, so as to at least partially convert said at least one compound of platinum to at least one oxide of platinum, to at least partially convert said at least one compound of iron to at least one oxide of iron, and to at least partially convert said at least one compound of said at least one additional element to oxide of said additional element.

84. A composition of matter in accordance with claim 83, wherein said first temperature is in the range of from about 30° to about 200° C., and said second temperature is in the range of from about 300° to about 700° C.

85. A composition of matter in accordance with claim 77, wherein said compound of platinum is $Pt(NH_3)_4(NO_3)_2$.

86. A composition of matter in accordance with claim 69, wherein component (iv) is palladium metal.

87. A composition of matter in accordance with claim 69, wherein component (iv) is silver metal.

* * * * *

UNITED STATES PATENT AND TRADEMARK OFFICE
CERTIFICATE OF CORRECTION

PATENT NO. : 4,920,088
DATED : April 24, 1990
INVENTOR(S) : John H. Kolts

It is certified that error appears in the above-identified patent and that said Letters Patent is hereby corrected as shown below:

Title page, [75] Inventor, delete "W." before "Kolts" and insert --- H. --- therefor.

Claim 33, column 20, line 32, delete "20°" at the end of the line, and insert --- 200° --- therefor.

Claim 83, column 24, line 56, delete "at least one" before "additional" and insert --- at least one --- before "oxide".

Signed and Sealed this

Sixteenth Day of July, 1991

*Attest:*

HARRY F. MANBECK, JR.

*Attesting Officer*      *Commissioner of Patents and Trademarks*